United States Patent
Everingham et al.

(10) Patent No.: US 7,434,204 B1
(45) Date of Patent: Oct. 7, 2008

(54) METHOD AND APPARATUS FOR MANAGING SOFTWARE PROCESSES

(75) Inventors: James Everingham, Aptos, CA (US); Christopher Houck, Saratoga, CA (US)

(73) Assignee: LiveOps, Inc., Santa Clara, CA (US)

( * ) Notice: Subject to any disclaimer, the term of this patent is extended or adjusted under 35 U.S.C. 154(b) by 595 days.

(21) Appl. No.: 10/886,333

(22) Filed: Jul. 7, 2004

(51) Int. Cl.
G06F 9/44 (2006.01)
G06F 15/173 (2006.01)
G06F 11/00 (2006.01)
G06F 9/46 (2006.01)

(52) U.S. Cl. .................. 717/120; 709/223; 709/224; 714/47; 718/102

(58) Field of Classification Search ............. 714/23, 714/37–39, 47; 713/320; 395/133, 680; 717/120–123; 709/223–226; 718/100–105
See application file for complete search history.

(56) References Cited

U.S. PATENT DOCUMENTS

| | | | |
|---|---|---|---|
| 5,274,813 A * | 12/1993 | Itoh ........................... 717/127 |
| 5,675,798 A * | 10/1997 | Chang ........................ 709/224 |
| 5,720,018 A * | 2/1998 | Muller et al. ............... 345/581 |
| 6,557,035 B1 * | 4/2003 | McKnight .................... 709/224 |
| 6,738,933 B2 * | 5/2004 | Fraenkel et al. .............. 714/47 |
| 6,874,099 B1 * | 3/2005 | Balasubramanian et al. ... 714/4 |
| 6,898,718 B2 * | 5/2005 | Morrow ...................... 713/320 |
| 6,928,585 B2 * | 8/2005 | Bartley ......................... 714/23 |
| 7,058,046 B2 * | 6/2006 | Celi et al. .................... 370/352 |
| 7,139,381 B2 * | 11/2006 | McCormack .......... 379/207.02 |
| 7,197,559 B2 * | 3/2007 | Goldstein et al. ........... 709/224 |
| 7,249,179 B1 * | 7/2007 | Romero et al. .............. 709/226 |
| 7,353,269 B2 * | 4/2008 | Aki et al. .................... 709/224 |
| 2002/0152305 A1 * | 10/2002 | Jackson et al. .............. 709/224 |
| 2002/0198985 A1 * | 12/2002 | Fraenkel et al. ............. 709/224 |
| 2003/0065986 A1 * | 4/2003 | Fraenkel et al. ............... 714/47 |
| 2005/0015489 A1 * | 1/2005 | Whynot et al. .............. 709/225 |
| 2005/0097207 A1 * | 5/2005 | Gluhovsky et al. .......... 709/224 |

OTHER PUBLICATIONS

Jin et al., "Load Balancing In Distributed Workflow Management System," Mar. 2001, ACM, p. 522-530.*
Reis et al., "A Policy-based Resource Instantiation Mechanism to Automate Software Process Management," Jul. 2002, ACM, p. 795-802.*
Cangussu et al., "Monitoring the Software Test Process Using Statistical Process Control: A Logarithmic Approach," Sep. 2003, ACM, p. 158-167.*

* cited by examiner

*Primary Examiner*—Wei Y. Zhen
*Assistant Examiner*—Qing Chen
(74) *Attorney, Agent, or Firm*—Patent Esque Law Group, LLP; Roxana H. Yang

(57) ABSTRACT

A method and apparatus for managing software processes to improve their stability. Each instance of a software process periodically reports its operating status to a recycler. The status information identifies how long the instance has been continuously executing and how many transactions the instance has executed during that time. If either value exceeds a threshold associated with the process or that specific instance of the process, the instance is instructed to recycle. If instructed to recycle, the instance may stop accepting new transactions, finish handling its current transactions, then restart and resume normal operation. The recycler may postpone or cancel a recycle instruction if the combined capacity of all active instances of the process is below, or may fall below, a minimum desired capacity for the process. The recycler may also recycle itself.

27 Claims, 2 Drawing Sheets

METHOD AND APPARATUS FOR MANAGING SOFTWARE PROCESSES

BACKGROUND

This invention relates to the field of computer systems. More particularly, a method and apparatus are provided for managing a set of server processes so as to provide higher stability and availability of the processes.

Software tends to become unstable when executed for long, continuous periods. In addition, transactional software tends to become increasingly unstable as more and more transactions are processed. This does not bode well for servers (e.g., web servers, database servers), applications and other processes that need to operate for long periods of time and/or process large numbers of transactions or service requests.

An organization that executes software for handling transactions and/or performing other processing may operate multiple copies of a particular process. This duplication may help minimize disruption to the organization's operations if one process fails. However, even if the organization's architecture can tolerate failure of one process, if multiple processes fail in the same time frame the architecture may be overwhelmed. In addition, such a scheme does nothing to prevent a process from becoming unstable.

There is therefore a need for a method and an apparatus for increasing the stability of a set of software processes, to alleviate the danger of multiple simultaneous failures.

SUMMARY

In one embodiment of the invention, a method and apparatus are provided for managing software processes to improve their stability. Each instance of a software process periodically reports its operating status to a recycler. The status information identifies how long the instance has been continuously executing, how many transactions the instance has executed during that time, the instance's current load or capacity, etc.

If either value exceeds a threshold associated with the process or that specific instance of the process, the instance is instructed to recycle. If instructed to recycle, the instance stops accepting new transactions, finishes handling its current transactions, then restarts and resumes normal operation.

The recycler may postpone or cancel a recycle instruction if the combined capacity of all active instances of the process is below, or may fall below, a minimum desired capacity for the process.

Recycling rules specific to an instance of the process may override rules associated with the process (e.g., to accommodate the unique operating environment of the instance).

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a method and apparatus are provided for managing a set of software processes to improve their stability and availability. In this embodiment, a management process called a recycler requires processes to recycle (e.g., restart) before they become unstable. Various data or statistics may be gathered or monitored to determine when a process should be recycled. Such data may include a number of transactions a process has handled, a length of time the process has been alive, etc. This information may be compared to predetermined thresholds, in order to determine whether the process should be recycled.

Figure 1:
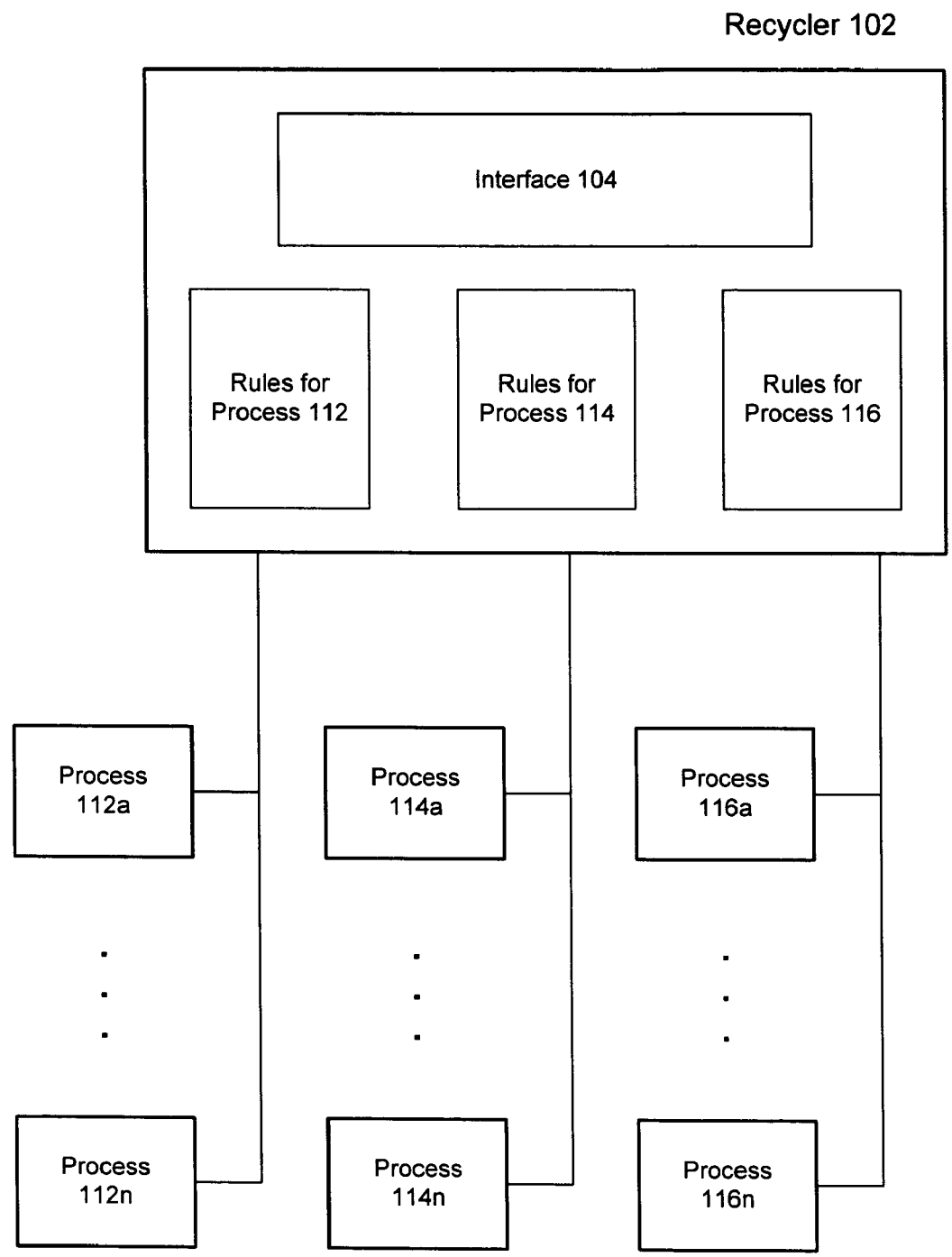
FIG. 1 is a block diagram depicting a system of cooperating software processes, in accordance with an embodiment of the present invention.

FIG. 1 is a block diagram of a software environment in which an embodiment of the invention may be implemented. Other embodiments of the invention may be derived from this embodiment.

In the illustrated environment, multiple types or groups of software processes are executed, which may be server processes (e.g., web or data servers), communication processes (e.g., socket listeners), applications, applets, etc. Thus, processes $112a$-$112n$ are instances of one type of process (e.g., web servers for handling http requests), processes $114a$-$114n$ may be of another type (e.g., call servers for routing telephone calls), processes $116a$-$116n$ may be of yet another type (e.g., database servers, caches), and so on.

Processes 112, 114, 116 may execute on virtually any computing devices, but are electrically coupled to recycler process 102. They may be coupled via wired and/or wireless links, which may be dedicated or shared. The computing devices on which the processes execute are not limited; they may have virtually any hardware or software configuration.

Recycler 102 is a software process that applies rules for managing different types of processes and/or rules for managing individual processes. For example, rules for process 112 may include any number of rules for managing processes $112a$-$112n$. However, rules overriding or complementing rules for process type 112 may also be specified for a particular process (e.g., process $112a$). A recycler may manage any number of types of processes simultaneously, and any number of instances of a particular type of process may be executing at the same time.

Rules for a type of process or a process instance may specify a period of time of constant execution after which a process should be recycled, a number of transactions after which the process should be recycled, a current or preferred version of the process' software, a minimum or desired capacity for a process or a type of process, how to terminate or recycle a process, etc. Other criteria that may be used to determine when to recycle a process include: available virtual memory, disk space (e.g., amount used for temp files, amount available), etc.

The recycler may also track various data for a process during its execution, such as how long it has been alive (i.e., how long it has been executing), how many transactions it has processed, the version of its software that it is running, the hardware on which it is running, etc. Such data may be obtained by polling processes or process types, or a process may be configured to broadcast or transmit the data to the recycler.

A recycler may also be configured to recycle itself. For example, it may have its own pertinent rules indicating when it should be recycled. Illustratively, a recycler may be permitted to operate for several days or a few weeks before recycling itself. Processes monitored by recycler 102 may be configured to broadcast their status on a frequent basis (e.g., every five seconds, every ten seconds), and so the recycler will quickly learn the statuses of all processes after it recycles.

Recycler 102 includes interface 104, which allows an operator or administrator to configure rules, review the status of different processes or types of processes, add new types or processes or process instances, force the immediate recycling of a process, etc. In one implementation, interface 104 provides a visual display of the status of each type of process (e.g., number of instances, capacities, scheduling of processes for recycling) and allows the operator to alter the management for a process or type of process in real time (e.g., to override a rule).

When a process is determined by the recycler to be approaching possible (or certain) instability, the recycler instructs it to stop taking new connections or requests (e.g., data requests, communication connections), and to stop or restart after it finishes handling all current connections or requests. Each process or type of process may be considered to be approaching instability differently.

For example, one type of process, such as a process for handling or routing telephone calls, may typically reach this point after running continuously for 72 hours or after handling 5,000 calls. Another type of process, such as an interactive voice response (IVR) process may become particularly susceptible to failure after 48 hours of continuous operation or after playing 8,000 audio messages. The data used to consider a process unstable or to signal the possible approach of instability may be determined through observation, testing or other means.

If a minimum desired capacity is specified for a type of process (e.g., as a rule for that process type), a recycler may not instruct a process to recycle if doing so will cause the capacity of that type of process to fall below the minimum desired capacity. This rule may be overridden, however (e.g., via interface 104 of recycler 102). In addition, after a process is instructed to recycle, but before it actually restarts, a recycler may instruct it to abort or postpone recycling and return to normal service (e.g., because another process died and additional capacity is needed).

Each process type (e.g. process 116) may be considered (and depicted via interface 104 as) a pool of instances of the process. Each process would thus be associated with a different pool. In one embodiment of the invention, one or more pools of backup process instances are managed by recycler 102. When a particular instance of a process is being recycled, a backup process may be brought on-line in order to avoid losing too much capacity. The recycled process may be demoted to the backup pool.

When an instance of a process is started, it broadcasts its presence and registers with the recycler. At that time, it supplies information such as its name and/or the name of the computing device on which it is executing, its process type, its software version, the time it started, how many transactions it has processed so far (if any), its capacity (e.g., throughput, data rate, rate of handling transactions), etc. Alternatively, a process' information may be supplied by an agent or other entity acting on behalf of the process (e.g., another module operating in tandem with the process).

After it is registered, the process periodically provides the recycler information such as the number of transactions it has processed (e.g., from the time it started, from its last report), how long it has been executing or the time at which it started executing, its current load, its maximum capacity, etc. This information may be sent automatically at specified intervals (e.g., every 5 seconds), may be sent only in response to being polled by the recycler, or may be sent with some other regularity (e.g., every transaction, every 100 transactions).

If data reported by a process exceeds a threshold for that process or the process' type, the recycler may then instruct it to recycle. Or, the recycler may instruct the process to take some other action. For example, if it is determined that the process is not executing a current or desired version of its software, the recycler may instruct it to stop taking new connections or requests, finish its current workload, and then recycle, but with an updated version of its software. The process may have to retrieve the software from a specified or predetermined location, or receive it from the recycler. As another alternative, the recycler could instruct a process to stop, and not automatically restart (e.g., to allow maintenance of its computing device).

In one embodiment of the invention, a process may be configured to notify the recycler that it may be unstable, and/or prompt the recycler to force or allow the process to recycle. For example, if the process may be corrupted or detects an error, it may inform the recycler. The recycler may then update its interface (e.g., interface 104 of FIG. 1) to indicate the process' troubled or uncertain status.

In an embodiment of the invention implemented in a TCP/IP network, a recycler listens on a specified socket, to which processes may connect or broadcast their information. When a recycler starts operating, it may broadcast its presence (e.g., on sockets that the processes listen to). In response, each process may register with the recycler. In other embodiments, processes transmit their status information regardless of whether there is a recycler in operation.

Figure 2:
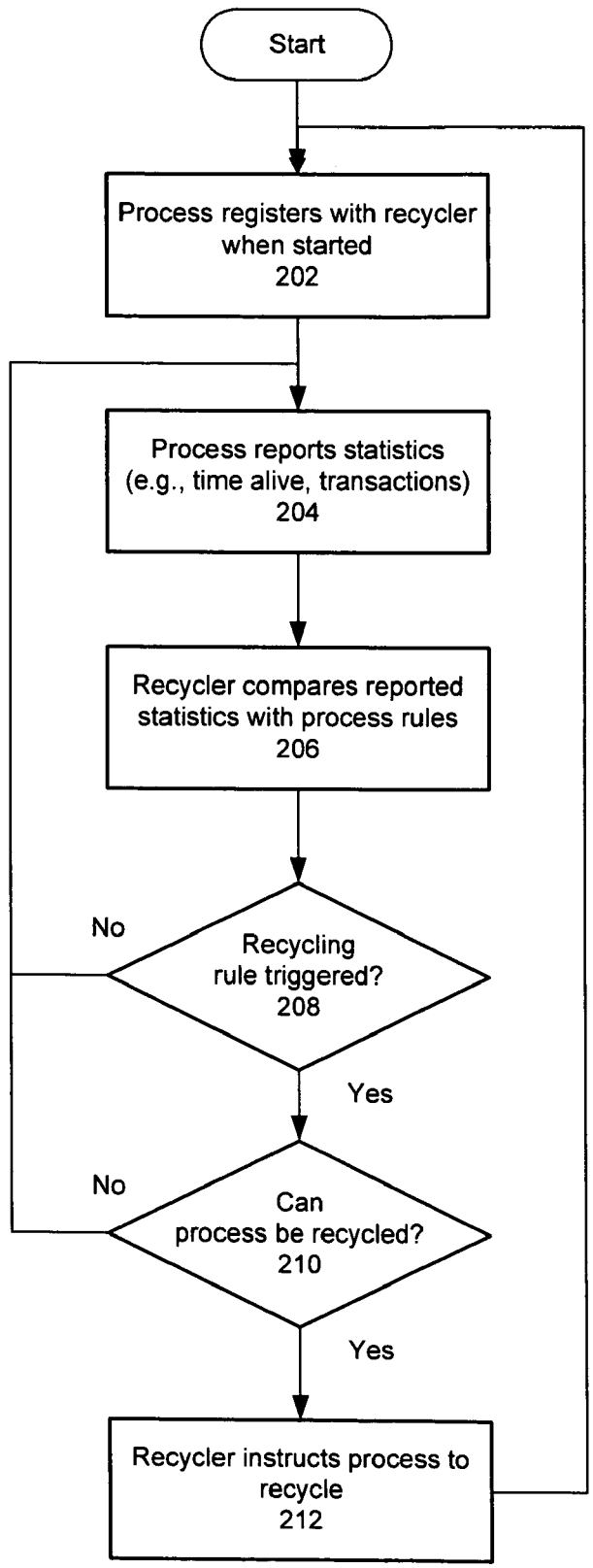
FIG. 2 is a flowchart illustrating one method of managing multiple software processes to improve their stability, in accordance with an embodiment of the invention.

FIG. 2 is a flowchart demonstrating a method of managing a set of software processes to improve their stability, according to one embodiment of the invention.

In operation 202, a process managed by a recycler starts or restarts. The process registers with the recycler by identifying itself (e.g., network address) and its type, identifying its capacity, etc.

The recycler may then retrieve rules for managing the process based on the process type and/or the identity of the individual process. Illustratively, the rules may indicate when the process should be recycled, terminated or otherwise affected (e.g., after processing 5,000 transactions, after being up for 72 hours, when a new version of the process' software is available).

In operation 204, the process reports its operating status or condition. In the illustrated embodiment, the process reports how long it has been running, its current load, its capacity, how many transactions it has processed, etc. Different types of processes may handle different types of transactions having a range of complexities.

The process may report its status on its own initiative, on a periodic basis (e.g., every 5 seconds, every 100 transactions). Or, it may report its status only when polled or prompted by the recycler or some other entity.

The process may also include with its status a query as to whether it should recycle. If so, the recycler will respond positively or negatively depending on whether any recycling rules apply, as discussed next. The recycler's response to the process' query may serve as an acknowledgement, or as part of an acknowledgement, that the recycler received the process' status.

In operation 206, the recycler compares the process' reported status or statistics with rules that apply to the process and the process' type. Such rules may indicate that the process should be recycled after a certain number transactions or after running continuously for a specified period of time. Rules may also be configured to indicate that the process should be instructed to restart and run a newer version of its software when available, to go down for maintenance at a specified time or after a specified time period or number of transactions, whether the process should wait until all connections to the process have completed before initiating a recycling operation, etc.

In operation 208, the recycler determines whether any of the applicable rules indicate that the process should be recycled, suspended, terminated or otherwise affected. If so, the illustrated method continues with operation 210. Otherwise, the method returns to operation 204.

In operation 210, the recycler determines whether current operating conditions, or any other applicable rules, allow the process to be recycled or prevent the process from being recycled.

For example, some or all types of processes in the recycler's operating environment may have specified minimum desired capacities, in which case the recycler is informed of the capacity of each instance of such a process type. If the capacity of the process's type would fall below its minimum desired capacity if the process were to stop taking new connections or requests, then it may not be allowed to recycle yet.

In particular, if only one instance of a particular process is executing, a rule may specify that the instance cannot be recycled, because this would cause the process to be down for some time.

If not allowed to recycle, the process' recycling may be postponed indefinitely, for a specified period of time, for number of transactions or other event (e.g., until all current connections or transactions are complete). Or, as indicated in FIG. 2, the method may return to operation 204, possibly after a delay, and the process may continue to report its status until it is allowed to recycle. If the process can recycle, the method advances to operation 212.

In operation 212, the recycler instructs the process to recycle. The recycler may also instruct the process to build or rebuild its software (e.g., to upgrade to a new version), or to take some other action, before restarting. The method of FIG. 2 then returns to operation 202 when the process restarts.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated method of managing a software process, comprising:
    registering a first process when said first process begins executing;
    maintaining a set of rules for the first process, wherein said set of rules indicate when to recycle the first process, and wherein said set of rules identify one or more of a threshold length of time and a threshold number of transactions;
    periodically receiving operating statistics from the first process, said operating statistics comprising:
        a time indicator configured to indicate a length of time the first process has been continuously executing; and
        a transaction indicator configured to indicate a number of transactions handled by the first process during said length of time;
    comparing said length of time to a threshold length of time associated with the first process;
    comparing said number of transactions to a threshold number of transactions associated with the first process;
    comparing a minimum desired capacity of a set of software processes that includes the first process to a current capacity of the set of software processes minus a first capacity of the first process; and
    instructing the first process to recycle if said current capacity minus said first capacity is not less than said minimum desired capacity and:
        said length of time exceeds a threshold length of time associated with the first process; or
        said number of transactions exceeds a threshold number of transactions associated with the first process.

2. The method of claim 1, further comprising:
    maintaining a set of rules for the set of software processes;
    wherein said rules indicate when to recycle the processes; and
    wherein said rules identify one or more of: said threshold length of time, said threshold number of transactions and said minimum desired capacity.

3. The method of claim 1, wherein said operating statistics include a current load of the first process.

4. The method of claim 1, wherein said operating statistics include a capacity utilization of the first process.

5. The method of claim 1, wherein the first process, in response to said instructing:
    ceases accepting new transactions; and
    restarts after completing handling current transactions.

6. The method of claim 1, further comprising, after said instructing:
    setting a capacity of the first process to zero; and
    if the current capacity of the set of software processes falls below said minimum desired capacity, instructing the first process to cancel said recycling.

7. The method of claim 1, wherein said periodically receiving comprises:
    polling the first process; and
    receiving said operating statistics in response to said polling.

8. The method of claim 1, wherein said registering comprises:
    receiving from the first process an identity of the first process.

9. The method of claim 8, wherein said identity comprises one or more of: a name of the first process, a network address of the first process, a name of a computing device on which the first process is executing, and a network address of the computing device.

10. The method of claim 1, wherein said registering comprises:
receiving from the first process a capacity of the first process.

11. The method of claim 1, wherein said registering comprises:
receiving from the first process a time at which the first process was started.

12. The method of claim 1, wherein said registering comprises:
receiving from the first process a number of transactions handled by the first process since the first process was started.

13. The method of claim 1, wherein said registering comprises:
receiving from the first process a type of the first process.

14. The method of claim 13, wherein said type is call management server.

15. The method of claim 13, wherein said type is interactive voice response server.

16. The method of claim 13, wherein said type is media server.

17. The method of claim 13, wherein said type is web server.

18. The method of claim 13, wherein said type is recycler.

19. A computer readable medium storing instructions that, when executed by a computer, cause the computer to perform a method of managing a software process, the method comprising:
registering a first process when said first process begins executing;
maintaining a set of rules for the first process wherein said set of rules indicate when to recycle the first process, and wherein said set of rules identify one or more of a threshold length of time and a threshold number of transactions;
periodically receiving operating statistics from the first process, said operating statistics comprising:
a time indicator configured to indicate a length of time the first process has been continuously executing; and
a transaction indicator configured to indicate a number of transactions handled by the first process during said length of time;
comparing said length of time to a threshold length of time associated with the first process;
comparing said number of transactions to a threshold number of transactions associated with the first process;
comparing a minimum desired capacity of a set of software processes that includes the first process to a current capacity of the set of software processes minus a first capacity of the first process; and
instructing the first process to recycle if said current capacity minus said first capacity is not less than said minimum desired capacity and:
said length of time exceeds a threshold length of time associated with the first process; or
said number of transactions exceeds a threshold number of transactions associated with the first process.

20. An automated method of managing software processes, comprising:
for each of multiple software processes, identifying multiple instances of each software process executing on a plurality of computing devices;
applying a first set of rules associated with a first software process to determine when to recycle a first instance, wherein said first set of rules identify one or more of a threshold length of time and a threshold number of transactions and wherein the first instance is an instance of the first software process;
periodically receiving from each instance of each software process one or more of:
an indicator of a length of time the instance has been continuously executing; or
a number of transactions handled by the instance during said length of time;
determining whether a length of time an instance has been continuously executing exceeds a threshold length of time associated with the instance;
determining whether a number of transactions handled by an instance exceeds a threshold number of transactions associated with the instance;
determining whether a processing capacity of the multiple instances of the first software process that include the first instance may fall below a minimum desired capacity if the first instance is recycled; and
instructing the first instance of the first software process to recycle if:
said length of time the first instance has been continuously executing exceeds said threshold length of time; or
said number of transactions handled by the first instance during said length of time exceeds said threshold number of transactions.

21. The method of claim 20, wherein said recycling comprises:
continuing to handle a set of current transactions currently being handled by the first instance;
accepting no additional transactions until the first instance is restarted; and
restarting the first instance after the current transactions are completed.

22. The method of claim 20, further comprising:
applying a second set of rules associated with the first instance of the first software process;
wherein said second set of rules overrides said first set of rules.

23. A computer readable medium storing instructions that, when executed by a computer, cause the computer to perform a method of managing software processes, the method comprising:
for each of multiple software processes, identifying multiple instances of each software process executing on a plurality of computing devices;
applying a first set of rules associated with a first software process to determine when to recycle a first instance, wherein said first set of rules identify one or more of a threshold length of time and a threshold number of transactions, and wherein the first instance is an instance of the first software process;
periodically receiving from each instance of each software process one or more of:
an indicator of a length of time the instance has been continuously executing; or
a number of transactions handled by the instance during said length of time;
determining whether a length of time an instance has been continuously executing exceeds a threshold length of time associated with the instance;

determining whether a number of transactions handled by an instance exceeds a threshold number of transactions associated with the instance;

determining whether a processing capacity of the multiple instances of the first software process that include the first instance may fall below a minimum desired capacity if the first instance is recycled; and instructing the first instance of the first software process to recycle if:

said length of time the first instance has been continuously executing exceeds said threshold length of time; or said number of transactions handled by the first instance during said length of time exceeds said threshold number of transactions.

24. An apparatus for managing a set of software processes, comprising:

a processor; and a memory configured to store:

a set of rules configured to indicate when an instance of a software process should be recycled, said set of rules including:

a threshold period of time, wherein an instance of the software process may be instructed to recycle after executing continuously for a length of time exceeding said threshold period of time;

a threshold number of transactions, wherein an instance of the software process may be instructed to recycle after handling said threshold number of transactions; and a minimum desired capacity for the software process;

a communication module configured to periodically receive, from each executing instance of the software process:

a length of time the instance of the software process has been continuously executing; and a number of transactions handled by the instance of the software process during said length of time;

an interface configured to indicate when an instance of the software process should be recycled; and a recycler configured to instruct a first instance of the software process to recycle if:

the first instance of the software process has been executing continuously for a period of time exceeding said threshold period of time; or the first instance of the software process has handled a number of transactions greater than said threshold number of transactions without restarting, wherein said recycler only instructs the first instance of the software process to recycle if the combined capacity of all other executing instances of the software process is not less than said minimum desired capacity.

25. The apparatus of claim 24, wherein said interface provides human-comprehendible statuses of the instances of the software process.

26. The apparatus of claim 24, wherein said recycler is configured to recycle itself.

27. The apparatus of claim 24, wherein said recycler is further configured to instruct the first instance of the software process to cancel said recycling if said combined capacity falls below said minimum desired capacity.

* * * * *